(12) United States Patent
Na et al.

(10) Patent No.: US 10,814,777 B2
(45) Date of Patent: Oct. 27, 2020

(54) SEQUENTIAL LIGHTING DEVICE AND METHOD THEREOF

(71) Applicants: Hyundai Motor Company, Seoul (KR); Kia Motors Corporation, Seoul (KR)

(72) Inventors: Jin-Ho Na, Yongin-si (KR); Dong-Jin Park, Seoul (KR); Seung-Jin Lee, Hwaseong-si (KR); Gwon-Hak Lee, Hwaseong-si (KR); Jung-Bin Kim, Busan (KR); Sung-Uk Choi, Suwon-si (KR)

(73) Assignees: Hyundai Motor Corporation, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/159,014

(22) Filed: Oct. 12, 2018

(65) Prior Publication Data

US 2019/0168660 A1 Jun. 6, 2019

(30) Foreign Application Priority Data

Dec. 5, 2017 (KR) .......................... 10-2017-0165848

(51) Int. Cl.
*B60Q 1/38* (2006.01)
*F21S 43/13* (2018.01)
(Continued)

(52) U.S. Cl.
CPC ............... *B60Q 1/38* (2013.01); *F21S 43/13* (2018.01); *H05B 45/10* (2020.01); *H05B 47/155* (2020.01)

(58) Field of Classification Search
CPC ... B60Q 1/38; B60Q 3/14; B60Q 3/18; B60Q 2300/14; B60Q 2300/142–144;
(Continued)

(56) References Cited

U.S. PATENT DOCUMENTS

| 8,398,284 | B1 * | 3/2013 | Dvorzsak | .............. | F21S 48/215 |
| | | | | | 362/249.02 |
| 2006/0133103 | A1 * | 6/2006 | Muhlbaier | ........... | B60Q 1/2607 |
| | | | | | 362/545 |

(Continued)

FOREIGN PATENT DOCUMENTS

| JP | 2017-119449 A | 7/2017 |
| KR | 10-1364487 B1 | 2/2014 |
| KR | 10-2015-0068042 A | 6/2015 |

OTHER PUBLICATIONS

Akshaynimbal (Simple Battery Level Indicator); Feb. 19, 2015; https://funinnovate.wordpress.com/2015/02/19/simple-battery-level-indicator/ (Year: 2015).*

(Continued)

*Primary Examiner* — Renan Luque
(74) *Attorney, Agent, or Firm* — Morgan, Lewis & Bockius LLP

(57) ABSTRACT

A sequential lighting device may include a power supply device configured for supplying the input power of a predetermined waveform, a sequential control circuit, which is an analog circuit, sequentially operated depending upon the input power to generate a sequential operation signal, and a switching circuit for turning on or off a plurality of light sources of a lamp module depending upon the sequential operation signal.

18 Claims, 7 Drawing Sheets

(51) Int. Cl.
*H05B 45/10* (2020.01)
*H05B 47/155* (2020.01)

(58) Field of Classification Search
CPC .......... B60Q 2300/12; B60Q 2300/122; B60Q 1/343; B60Q 1/2665; H05B 33/0845; H05B 37/029; H05B 33/0848; F21S 43/13; B60R 1/1207
See application file for complete search history.

(56) References Cited

U.S. PATENT DOCUMENTS

| | | | |
|---|---|---|---|
| 2011/0181197 A1* | 7/2011 | Kanda | B60Q 1/38 |
| | | | 315/268 |
| 2012/0025970 A1* | 2/2012 | Beach | B60Q 1/38 |
| | | | 340/478 |
| 2013/0127612 A1* | 5/2013 | Stadler | B60Q 1/34 |
| | | | 340/465 |
| 2014/0062689 A1 | 3/2014 | Huang | |
| 2016/0031365 A1* | 2/2016 | Yoon | B60Q 1/38 |
| | | | 340/478 |
| 2018/0281668 A1* | 10/2018 | Martin | B60Q 1/2665 |

OTHER PUBLICATIONS

Brian (LED indicates power source); Aug. 26, 2010; https://www.edn.com/design/led/4363611/LED-indicates-power-source (Year: 2010).*

Theorycircuit (LED Voltmeter circuit); Mar. 31, 2016 http://www.theorycircuit.com/led-voltmeter-circuit/ (Year: 2016).*

Car Battery indicator; Feb. 1, 2001 https://www.electronics-lab.com/project/car-battery-indicator/ (Year: 2001).*

* cited by examiner

| a-COLUMN LED GROUP | ON | OFF | OFF | OFF |
| --- | --- | --- | --- | --- |
| b-COLUMN LED GROUP | ON | ON | OFF | OFF |
| c-COLUMN LED GROUP | ON | ON | ON | OFF |
| N-COLUMN LED GROUP | ON | ON | ON | ON |

UPON OPERATION OF TURN SIGNAL

UPON OPERATION OF EMERGENCY LIGHT

SEQUENTIAL LIGHTING DEVICE AND METHOD THEREOF

CROSS-REFERENCE(S) TO RELATED APPLICATIONS

The present application claims priority to Korean Patent Application No. 10-2017-0165848 filed on Dec. 5, 2017, the entire contents of which is incorporated herein for all purposes by this reference.

BACKGROUND OF THE DISCLOSURE

Field of the Disclosure

The present invention relates to a turn signal lamp, and more particularly, to a device and a method of controlling the same, which sequentially turns on each light source of turn signal lamps.

Description of Related Art

Generally, a vehicle is provided with various lamps having a lighting function for easily confirming an object located near the vehicle when driving at night and a signal function for notifying other vehicles or pedestrians of the driving state of the vehicle.

A turn signal lamp among various lamps is disposed at front/rear and left/right sides of the vehicle. Accordingly, when the vehicle changes its driving lane or turns at an intersection, etc. while driving, by providing the turning direction of the vehicle to the opponent driver or the pedestrian, the nearby vehicles or the pedestrian can know it and prepare for the advance.

The turn signal lamp includes multiple light sources to turn on each light source group sequentially. Accordingly, in order to control timing of each light source group, a separate controller such as a micom, a Micro Controller Unit (MCU), a microchip, etc. should be applied. Furthermore, a constant-current circuit for each light source group (channel) should be applied.

There are the problems that the cost increases due to the application of the separate controller, and if the number of the light source groups increases, the specification of the separate controller is changed. Furthermore, there is the problem in that in the turn signal separated into two, the two separate controllers should be applied. Furthermore, there is the problem in that cost increases due to the application of the constant current circuit.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a sequential lighting device and a method thereof, which need not a separate controller structure for the timing control.

Furthermore, various aspects of the present invention are directed to providing the sequential lighting device and the method thereof that can change a lighting mode by only a simple control.

Furthermore, various aspects of the present invention are directed to providing the sequential lighting device and the method thereof that the timing control is not needed even in the turn signal separately applied to the separated lamps.

Various aspects of the present invention provide the sequential lighting device that a separate controller structure is not required for the timing control to achieve the objects.

The sequential lighting device includes a power supply device configured for supplying the input power of a specific waveform; a sequential control circuit, which is an analog circuit, sequentially operated depending upon the input power to generate a sequential operation signal; and a switching circuit turning on or off a plurality of light sources of a lamp module depending upon the sequential operation signal.

In the present time, the specific waveform may be configured for being a saw tooth waveform having an OFF period during which no power is supplied and a rising period during which the power gradually rises as one cycle.

Furthermore, the specific waveform may be configured for selectively having a stable period that maintains the maximum power during a certain time until next cycle is performed.

Furthermore, the rising period may be configured for use of sequential voltage breakdown.

Furthermore, the sequential control circuit may be configured for being a zener diode set which is connected in parallel and has different breakdown voltages, respectively.

Furthermore, the one cycle may be configured for being less than 200 ms.

Furthermore, the switching circuit may be configured for having a plurality of switching elements connected in parallel, and the switching element is any one of a Field Effect Transistor (FET), a Metal Oxide Semiconductor FET (MOSFET), an Insulated Gate Bipolar Mode Transistor (IGBT), a Gate Turn-Off (GTO), an Integrated Circuit (IC).

Furthermore, the power supply device may be configured for use of a separate power or a vehicle power.

Furthermore, the specific waveform may be configured for being changed for changing a lighting mode from upon operation of a turn signal to upon operation of an emergency light.

Furthermore, the plurality of light source groups may be configured for being connected in parallel, and the plurality of light source groups may be configured for having a plurality of light sources connected in series, respectively, and the light source may be configured for being any one of a Light Emitting Diode (LED), an Organic LED (OLED), a Carbon NanoTube (CNT), and an Ultra Constant Discharge Lamp (UCD).

On the other hand, another exemplary embodiment of the present invention can provide a sequential lighting method including a power supply device supplying the input power of a specific waveform; a sequential control circuit, which is an analog circuit, sequentially operated depending upon the input power to generate a sequential operation signal; and a switching circuit turning on or off a plurality of light source groups of a lamp module depending upon the sequential operation signal.

According to an exemplary embodiment of the present invention, it is possible to perform sequential lighting of the lamp by only an analog circuit without a separate controller structure for the timing control.

Furthermore, another effect of the present invention is that only the zener diode breakdown voltage value needs to be distributed, such that the timing control is not required even in the turn signal separately applied to the separated lamps.

Furthermore, yet another effect of the present invention is that the control when the sequential lighting is to be inactivated legally is simple.

Furthermore, still yet another effect of the present invention is that it is possible to change the lighting mode by changing only the vehicle voltage control.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
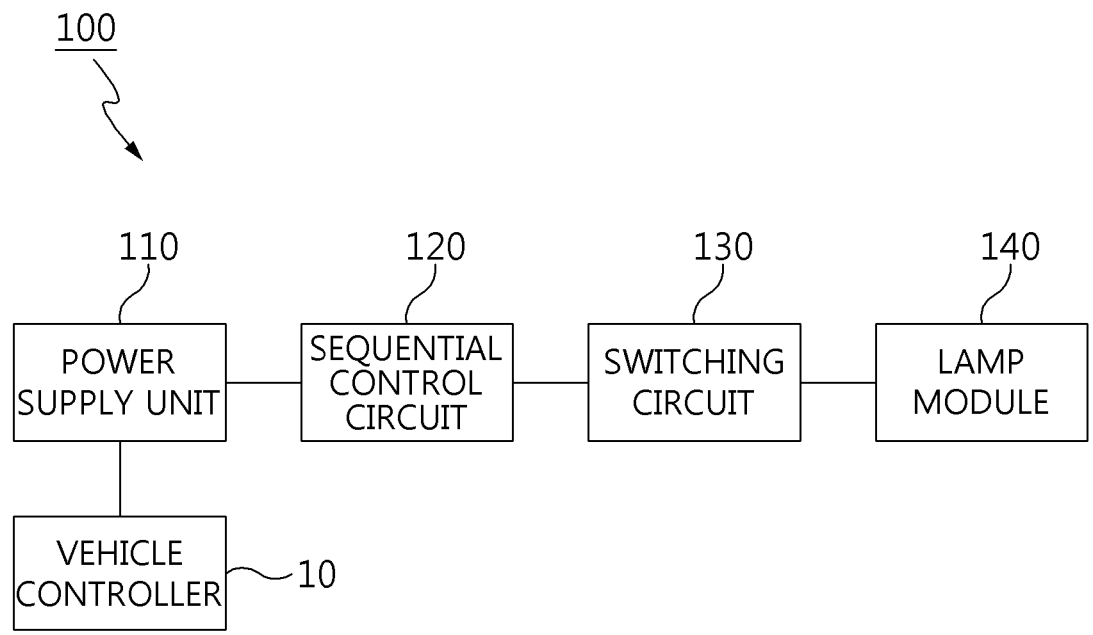
FIG. 1 is a configuration block diagram of a sequential lighting device in accordance with an exemplary embodiment of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in portion by the intended application and use environment.

In the figures, reference numbers refer to the same or equivalent parts of the present invention throughout the several figures of the drawing

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Various modifications and various forms may be made in the exemplary embodiments in accordance with various aspects of the present invention, so that specific embodiments are illustrated in the drawings and described in detail in the specification. It should be understood, however, that it is not intended to limit the present invention to the particular disclosed forms, but includes all modifications, equivalents, and alternatives falling within the spirit and technical scope of the present invention.

Like reference numerals are used for like elements in describing each drawing.

The terms "first," "second," and the like may be used to illustrate different components, but the components should not be limited by the terms. The terms are used to differentiate one element from another.

For example, a first component may be referred to as a second component, and similarly, the second component may be also referred to as the first component without departing from the scope of the present invention. The terms "and/or" includes a plurality of related listed items or any of a plurality of related listed items.

Unless otherwise defined, all terms including technical and scientific terms used herein have the same meaning as commonly understood by one of ordinary skill in the art to which the present invention belongs.

It will be further understood that terms, such as those defined in commonly used dictionaries, should be additionally interpreted as having a meaning which is consistent with their meaning in the context of the relevant art, and will not be interpreted in an idealized or overly formal sense unless expressly so defined in the application.

Hereinafter, a sequential lighting device and a method thereof in accordance with an exemplary embodiment of the present invention will be described in detail with reference to the accompanying drawings.

FIG. 1 is a configuration block diagram of a sequential lighting device 100 in accordance with an exemplary embodiment of the present invention. Referring to FIG. 1, the sequential lighting device 100 may include a power supply device 110 for supplying input power, a sequential control circuit 120 for generating a sequential operation signal depending upon the input power, a switching circuit 130 for performing a switching operation depending upon the sequential operation signal, and a lamp module 140 turned on or off depending upon the switching, etc.

The power supply device 110 performs the function that supplies the input power of a specific waveform. As a driver performs the operation command of a turn signal, the operation command of an emergency light, etc., a controller 10 controls the power supply device 110 to generate the input power of the specific waveform. In the present time, the power supply device 110 can use a separate power or a vehicle power. The vehicle controller 10 may be an Electronic Control Unit (ECU), a Hybrid Control Unit (HCU), a Vehicle Control Unit (VCU), etc. mounted to the vehicle.

The sequential control circuit 120 includes only an analog circuit, is sequentially operated depending upon the input power to generate a sequential operation signal, and transmits the sequential operation signal to the switching circuit 130.

The switching circuit 130 receives the sequential operation signal and performing the switching to turn on or off several light source groups configured in the lamp module 140.

The lamp module 140 includes the several light source groups in parallel to turn on the several light source groups sequentially depending upon the switching circuit 130.

Figure 2:
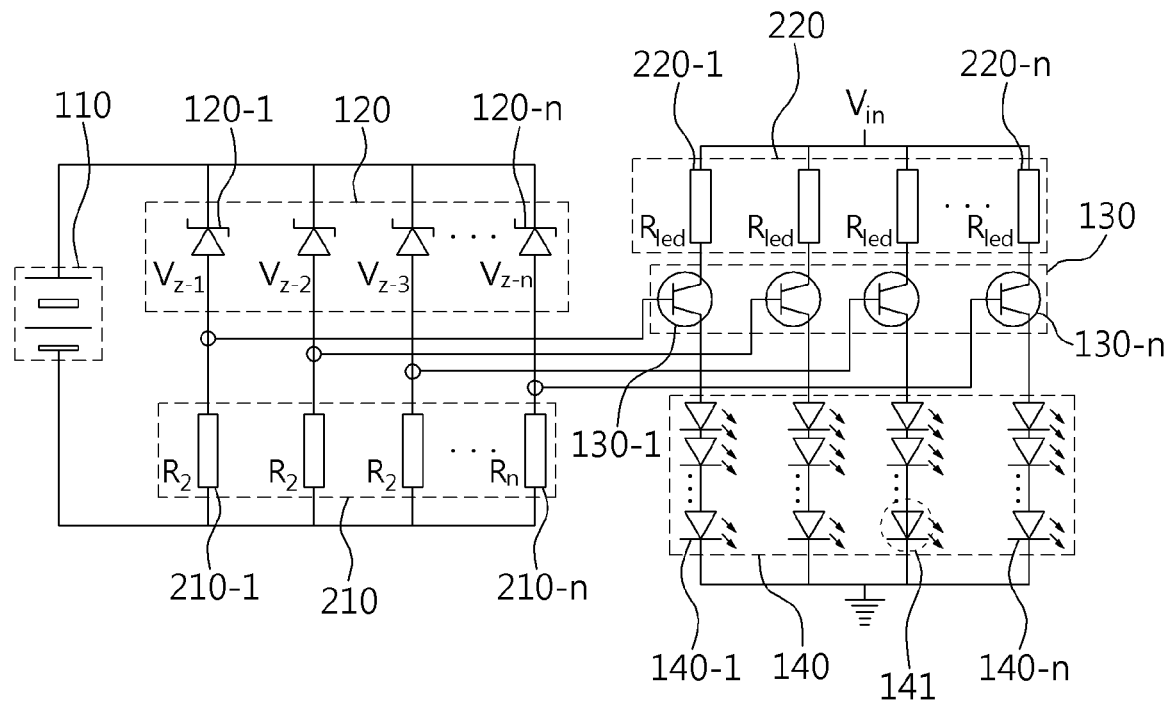
FIG. 2 is an example of implementing a circuit of the sequential lighting device illustrated in FIG. 1.

FIG. 2 is an example of implementing a circuit of the sequential lighting device 100 illustrated in FIG. 1. Referring to FIG. 2, the sequential control circuit 120 has the circuitry configuration to which first to $n^{th}$ zener diodes 120-1 to 120-n are connected in parallel. The first to $n^{th}$ zener diodes 120-1 to 120-n have different breakdown voltages, respectively. That is, the first to $n^{th}$ zener diodes 120-1 to 120-n have breakdown voltages $V_{Z-1}$, $V_{Z-2}$, $V_{Z-3}$ . . . $V_{Z-n}$.

The sequential control circuit 120 is connected to a first resistor block 210. That is, output end portions of the first to $n^{th}$ zener diodes 120-1 to 120-n are connected to first to $n^{th}$ resistors 210-1 to 210-n in series, respectively. The first to $n^{th}$ zener diodes 120-1 to 120-n have different breakdown voltages, respectively.

Furthermore, the connection points between the output end portions of first to $n^{th}$ zener diodes 120-1 to 120-n and the input end portions of the first to $n^{th}$ resistors 210-1 to 210-n are connected to the input end portions of first to $n^{th}$ switching elements 130-1 to 130-n, respectively.

One end portion of the switching circuit 130 is connected to a second resistor block 220 and the other end portion of the switching circuit 130 is connected to the lamp module 140. Specifically, first to $n^{th}$ current conversion resistors 220-1 to 220-n of the second resistor block 220 are connected to the collectors of the first to $n^{th}$ switching elements 130-1 to 130-n, respectively. Meanwhile, first to $n^{th}$ light source groups 140-1 to 140-n of the lamp module 140 are connected to the emitters of the first to $n^{th}$ switching elements 130-1 to 130-n, respectively. That is, an input voltage (Vin) is converted into an input current via the second resistor block 220. This may be expressed by the following Equation.

$$I_c = \frac{V_{in}}{R_{led}} \quad \text{Equation 1}$$

Herein, $I_c$ indicates an input current, $R_{led}$ indicates a current conversion resistor, and $V_{in}$ indicates an input voltage.

Furthermore, the first to $n^{th}$ zener diodes 120-1 to 120-n are connected to the bases of the first to $n^{th}$ switching elements 130-1 to 130-n, respectively. Accordingly, the base voltage (i.e., the sequential operation signal) is delivered to the first to $n^{th}$ switching elements 130-1 to 130-n.

The switching elements, other than the switching transistor illustrated in FIG. 2, may include a Field Effect Transistor (FET), a Metal Oxide Semiconductor FET (MOSFET), an Insulated Gate Bipolar Mode Transistor (IGBT), a Gate Turn-Off (GTO), an Integrated Circuit (IC), etc or a combination thereof.

The light source model 140 has the first to $n^{th}$ light source groups 140-1 to 140-n connected in parallel. The first to $n^{th}$ light source groups 140-1 to 140-n have a plurality of light sources 141 connected in series and/or in parallel. FIG. 2 illustrates only the configuration that the plurality of light sources 141 are connected in series.

The light source 141 can use a Light Emitting Diodes (LED), an Organic LED (OLED), a Carbon NanoTube (CNT), an Ultra Constant Discharge Lamp (UCD), etc, or combination thereof.

Figure 3:
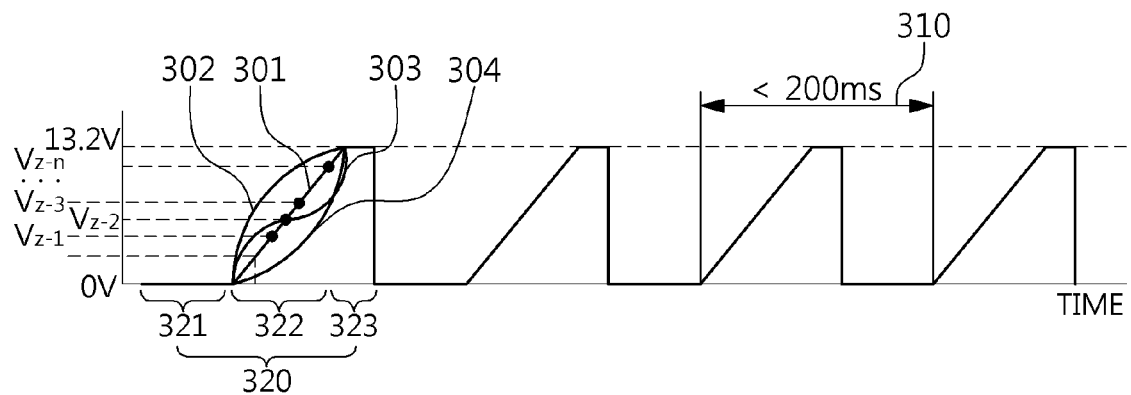
FIG. 3 is an input voltage waveform diagram in accordance with an exemplary embodiment of the present invention.

FIG. 3 is an input voltage waveform diagram in accordance with an exemplary embodiment of the present invention. Referring to FIG. 3, an input voltage waveform 320 may be a saw tooth waveform that has an OFF period 321 during which no power is supplied, a rising period 322 during which power increases gradually, linearly, and a stable period 323 that maintains the maximum power for a certain time until next cycle is performed as one cycle.

In the rising-period 322, there are rising curves 301, 302, 303 that breakdown voltages such as $V_{Z-1}$, $V_{Z-2}$, $V_{Z-3}$ . . . $V_{Z-n}$ rise gradually. The rising curves may be varied, such as a linear type 301, an arch type 302, 304, a free type 303. As illustrated in FIG. 3, the input voltage gradually changes from 0V to the vehicle voltage (about 13.2V).

FIG. 3 is a waveform of the input voltage supplied to the switching circuit (120 in FIG. 2) by the power supply device (110 in FIG. 2) to turn on lamps sequentially using the breakdown voltage characteristic of the zener diode. Herein, one cycle may be configured for being less than 200 ms 310.

The zener diode is a type of a semiconductor diode and also referred to as a constant-voltage diode. It has a PN junction structure similar to a general diode, but is different from the general diode in that it has very low and constant breakdown voltage characteristic. Accordingly, a current flows when the breakdown voltage equal to or greater than any certain value is applied in the reverse direction thereof. Main characteristics are the phenomena that the zener breakdown occurs at the voltage equal to or smaller than a certain voltage (about 5.6V) and the electron avalanche occurs at the voltage equal to or greater than a certain voltage (about 5.6V). A temperature coefficient is negative in the zener breakdown, and vice versa in the electron avalanche breakdown. Accordingly, the zener diode has a stable voltage characteristic over a wide current range and is used to simply make a constant voltage or to protect a circuit element from overvoltage.

Figure 4:
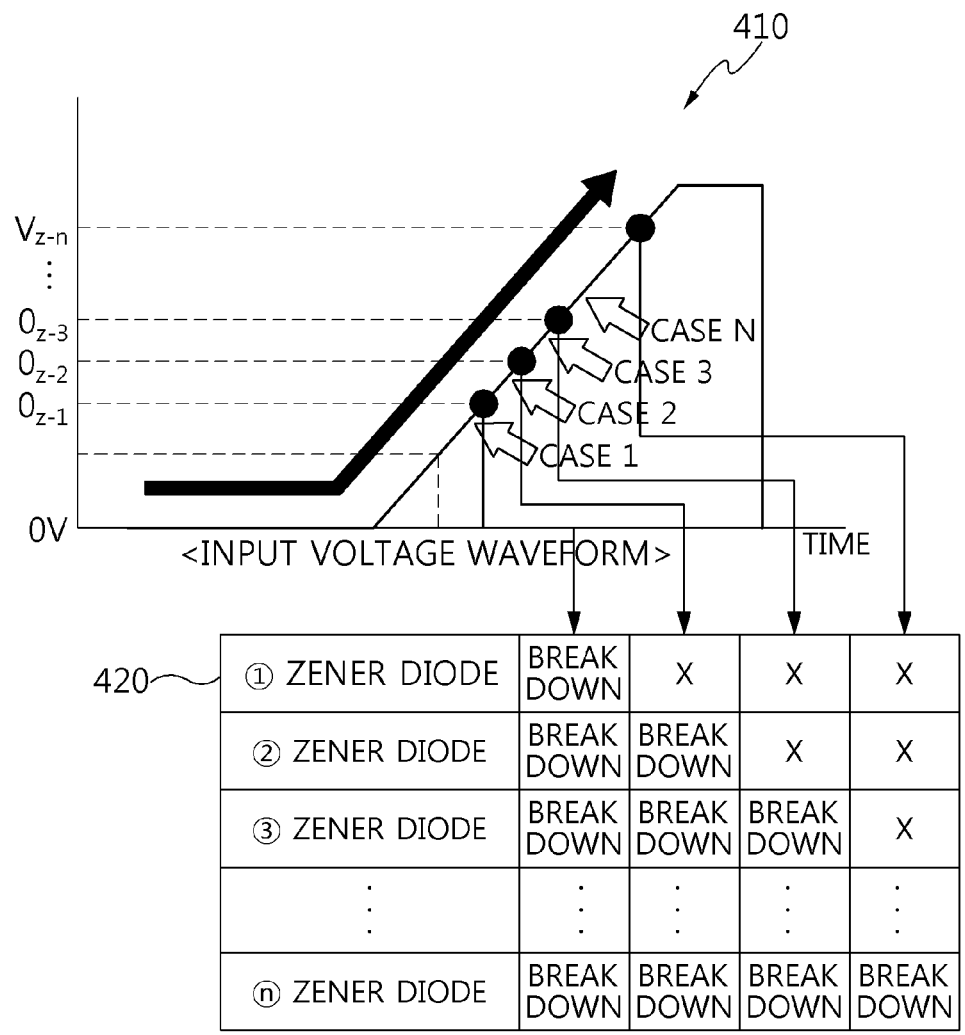
FIG. 4 is a diagram illustrating breakdown generation of a zener diode depending upon the input voltage waveform diagram illustrated in FIG. 3.

By use of the breakdown voltage characteristic of the zener diode, it is possible to turn on lamps sequentially depending upon the input voltage waveform. FIG. 4 is a conceptual diagram for the above.

FIG. 4 is a diagram illustrating breakdown occurrence of the zener diode depending upon the input voltage waveform diagram illustrated in FIG. 3. Referring to FIG. 4, if the input voltage increases gradually in the arrow direction along the input voltage waveform diagram 410, CASE 1, CASE 2, CASE 3 . . . CASE N occur. Based on the CASE 1, CASE 2, CASE 3 . . . CASE N, it is possible to know whether the breakdown occurs in the first to $n^{th}$ zener diodes (120-1 to 120-n in FIG. 2). For ease of understanding, a BRIEF SUMMARY table 420 is given. That is, as the time goes by, "breakdown" occurs on the first to $n^{th}$ zener diodes sequentially. Accordingly, if only the breakdown voltage value of the zener diode is distributed, a controller such as a micom is not required.

Figures 5, 6:
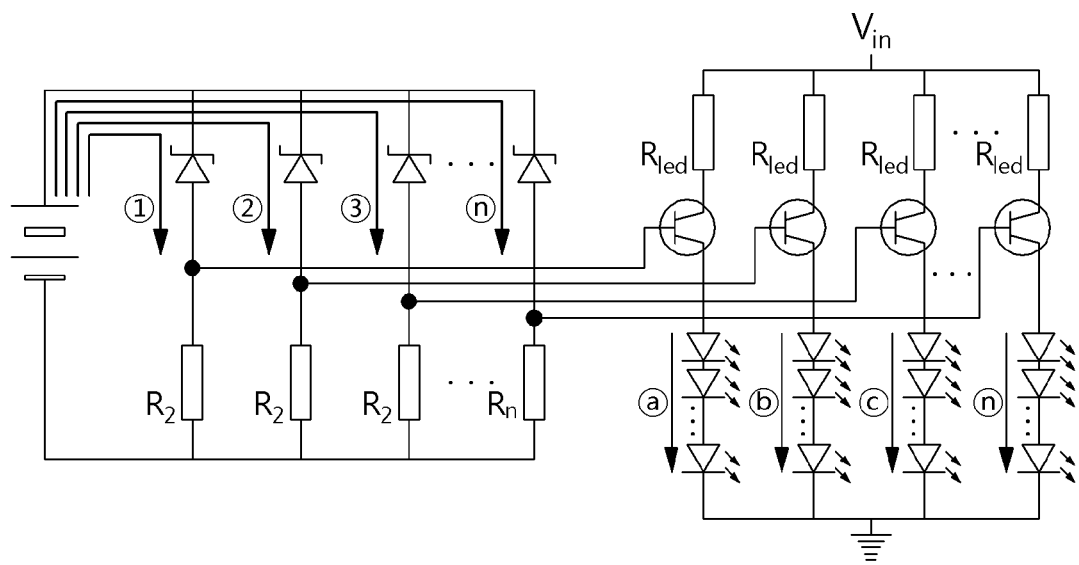
FIG. 5 is a diagram illustrating a breakdown order of the zener diode of the sequential lighting device illustrated in FIG. 1.
FIG. 6 is a table illustrating a lighting state of a light source group depending upon the breakdown order illustrated in FIG. 5.

FIG. 5 is a diagram illustrating a breakdown order of the zener diode of the sequential lighting device illustrated in FIG. 1. Referring to FIG. 5, the breakdown occurrence order on the first to $n^{th}$ zener diodes 120-1 to 120-n configured in the sequential control circuit (120 in FIG. 2) becomes ①, ②, ③, Ⓝ, respectively, and thereby the first to $n^{th}$ light source groups 140-1 to 140-$n$ also becomes ON or OFF by ⓐ, ⓑ, ⓒ . . . Ⓝ.

FIG. 6 is a table illustrating a lighting state of the light source group depending upon the breakdown order illustrated in FIG. 5. Referring to FIG. 6, as the time goes by, the light source groups sequentially becoming ON increase. That is, as the time goes by, ON or OFF states of an a-column LED group, a b-column LED group, a c-column LED group, and a N-column LED group are changed. In the instant case, the first to $n^{th}$ switching elements 130-1 to 130-$n$ are P-type transistors and the base voltage is negative. Accordingly, the N-column LED group continues to become an "ON" state, and ON or OFF states of other LED groups are changed as the time goes by. This is merely an example, and sequential lighting may be implemented variously.

Figure 7:
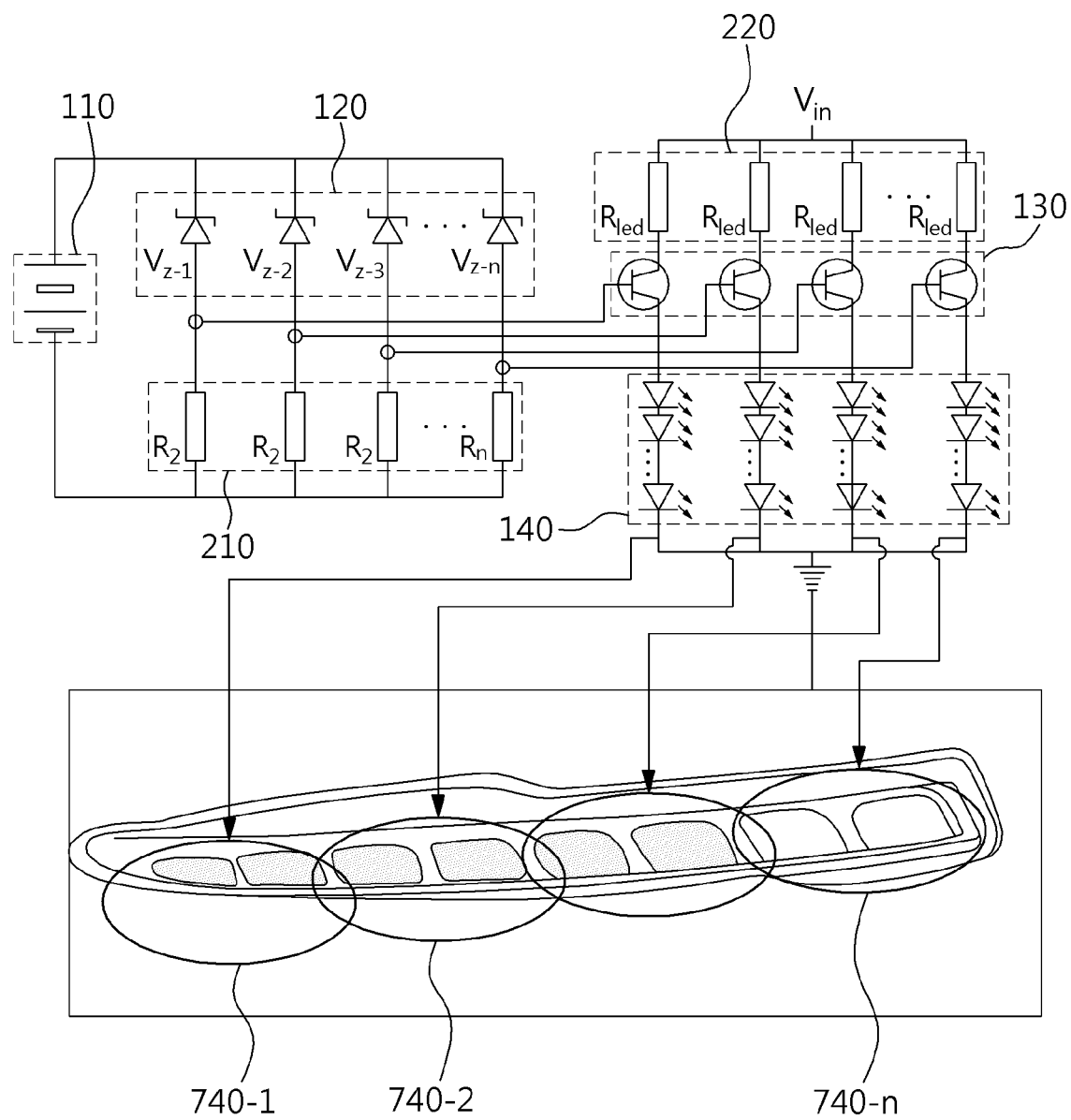
FIG. 7 is an example to which the sequential lighting device illustrated in FIG. 2 is applied to a turn signal lamp of a vehicle.

FIG. 7 is an example that the sequential lighting device illustrated in FIG. 2 is applied to a turn signal lamp of the vehicle. Referring to FIG. 7, the first to $n^{th}$ turn signal lamps 740-1 to 740-$n$ become ON or OFF sequentially.

Figure 8:
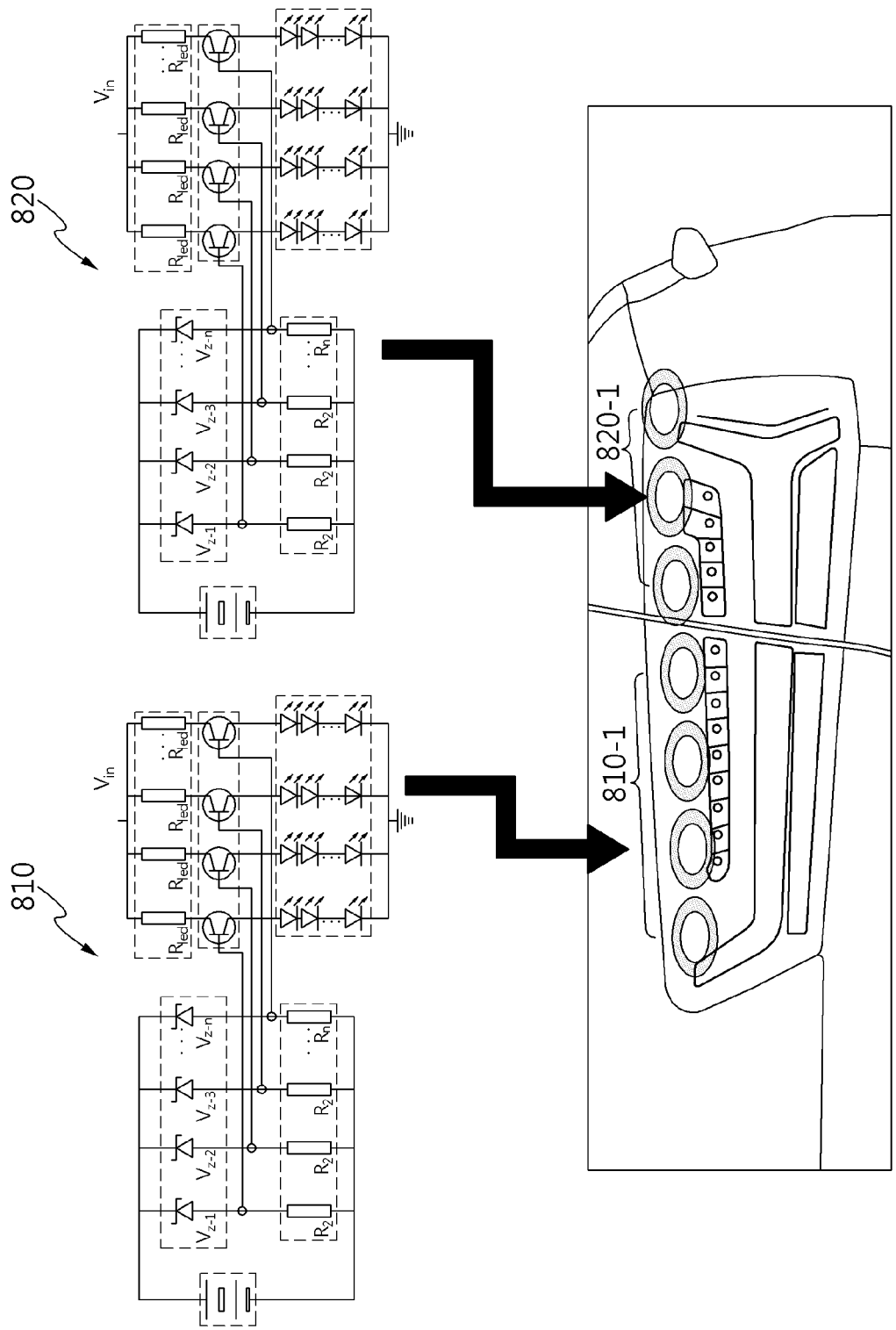
FIG. 8 is an example that applies the sequential lighting device illustrated in FIG. 2 to the separated turn signal lamp.

FIG. 8 is an example that applies the sequential lighting device illustrated in FIG. 2 to the turn signal lamp separated. Referring to FIG. 8, the turn signal lamp may be separately including a first section turn signal lamp 810-1 and a second section turn signal lamp 820-1. That is, there is the case that the turn signal lamp is distributed to a vehicle body and a trunk lid, respectively. In the instant case, a first sequential lighting device 810 and a second sequential lighting device 820 may be configured, respectively. Accordingly, a timing control is not required.

Figure 9:
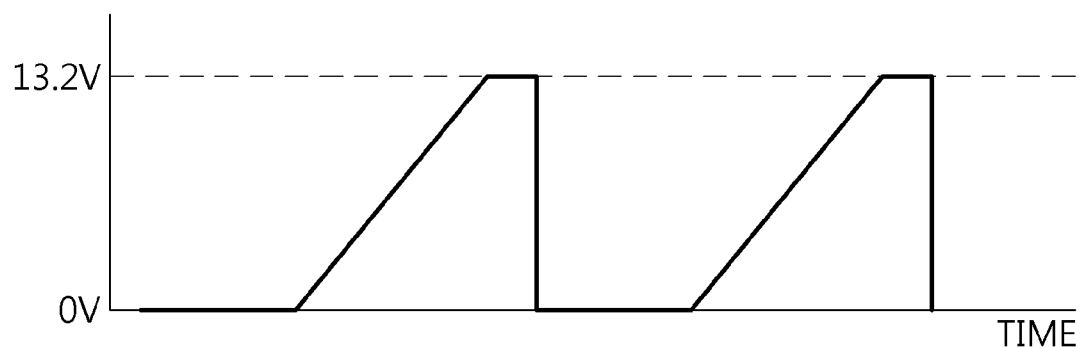
FIG. 9 is an input voltage waveform diagram upon operation of a turn signal in accordance with an exemplary embodiment of the present invention.
Figure 10:
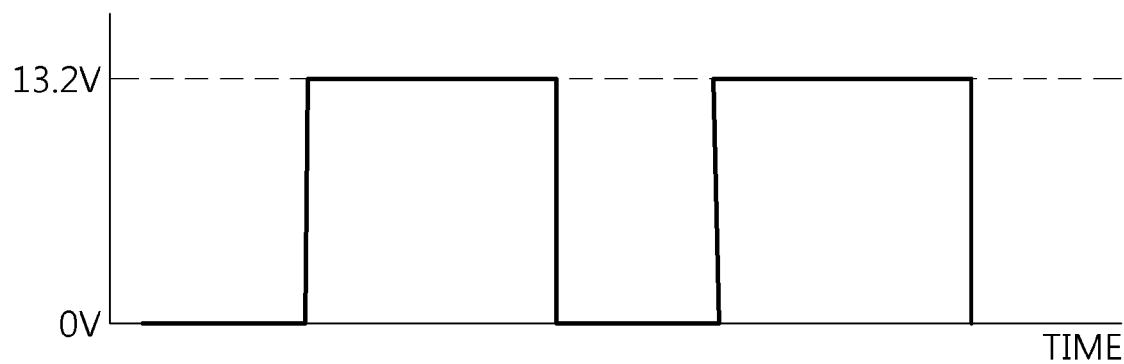
FIG. 10 is an input voltage waveform diagram upon operation of an emergency light in accordance with an exemplary embodiment of the present invention.

FIG. 9 is an input voltage waveform diagram upon operation of the turn signal in accordance with an exemplary embodiment of the present invention, and FIG. 10 is an input voltage waveform diagram upon operation of an emergency light in accordance with an exemplary embodiment of the present invention. That is, it may be changed for changing the lighting mode from upon operation of the turn signal to upon operation of the emergency light. Specifically, FIG. 9 is the waveform that the input voltage rises gradually, and FIG. 10 is a square waveform and not the gradual rising waveform.

Figure 11:
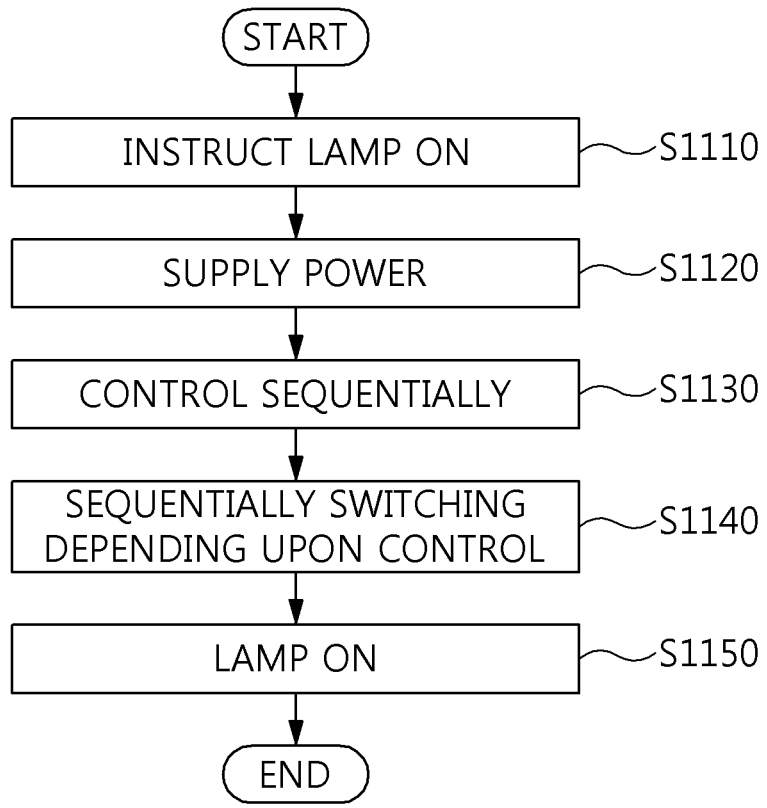
FIG. 11 is a flowchart illustrating a sequential lighting procedure in accordance with an exemplary embodiment of the present invention.

FIG. 11 is a flowchart illustrating the sequential lighting control procedure in accordance with an exemplary embodiment of the present invention. Referring to FIG. 11, the power supply device 110 supplies the input power of a specific waveform depending upon the driver's lamp operation instruction (S1110).

As such, the sequential control circuit 120, which is an analog circuit, is sequentially operated depending upon the input power to generate the sequential operation signal (S1130).

As such, the switching circuit 130 switches to turn on or off the plurality of light source groups of the lamp module 140 depending upon the sequential operation signal (S1140, S1150).

Figure 12:
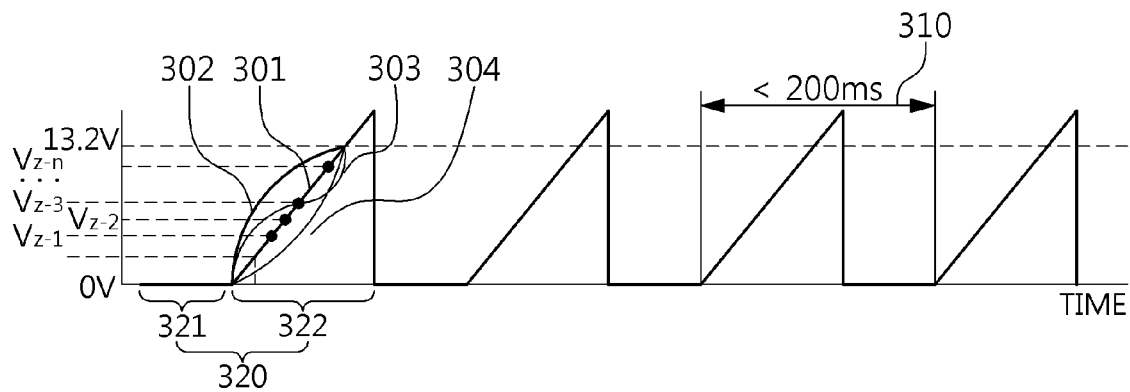
FIG. 12 is an input voltage waveform diagram in accordance with various exemplary embodiments of the present invention.

FIG. 12 is an input voltage waveform diagram in accordance with various exemplary embodiments of the present invention. Referring to FIG. 12, it is the input voltage waveform that has no the stable period illustrated in FIG. 3.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sequential lighting device, comprising:
a power supply device configured for supplying an input power having a predetermined waveform, in which the input power rises with a predetermined linear slope;
a sequential control circuit, which is an analog circuit and connected to the power supply device wherein the sequential control circuit is sequentially operated depending upon the input power to generate a sequential operation signal; and
a switching circuit connected to the sequential control circuit and a plurality of light sources of a lamp module, wherein the switching circuit is configured for turning on or off the plurality of light sources of the lamp module according to the sequential operation signal received from the sequential control circuit, and wherein the plurality of light sources is connected in series to form a column group, a plurality of column groups formed of the column group in plural is arranged in parallel and each column group including the plurality of light sources is turned on with a same power,
wherein the predetermined waveform has a rising period having a linear slope during which the input power rises with the predetermined linear slope, and
wherein the sequential control circuit is a zener diode set including a plurality of zener diodes which is connected in parallel and has different breakdown voltages, respectively, a front end of each of the plurality of zener diodes having a same voltage level.

2. The sequential lighting device of claim 1, wherein the predetermined waveform is a saw tooth waveform having an OFF period during which no input power is supplied and the rising period, as one cycle.

3. The sequential lighting device of claim 2, wherein the predetermined waveform further includes a stable period that maintains a maximum input power during a predetermined time until a next cycle is performed.

4. The sequential lighting device of claim 2, wherein the rising period utilizes sequential voltage breakdown.

5. The sequential lighting device of claim 2, wherein the one cycle is less than 200 ms.

6. The sequential lighting device of claim 1, wherein the switching circuit has a plurality of switching elements connected in parallel, and each of the switching elements is one of a Field Effect Transistor (FET), a Metal Oxide Semiconductor FET (MOSFET), an Insulated Gate Bipolar Mode Transistor (IGBT), a Gate Turn-Off (GTO), and an Integrated Circuit (IC).

7. The sequential lighting device of claim 1, wherein the power supply device utilizes a separate power or a vehicle power.

8. The sequential lighting device of claim 1, wherein the predetermined waveform is configured to be changed for changing a lighting mode from upon operation of a turn signal to upon operation of an emergency light.

9. The sequential lighting device of claim 1,
wherein each of the light sources is one of a Light Emitting Diode (LED), an Organic LED (OLED), a Carbon NanoTube (CNT), and an Ultra Constant Discharge Lamp (UCD).

10. A sequential lighting method, comprising:
supplying, by a power supply device, an input power having a predetermined waveform, in which the input power rises with a predetermined linear slope;
generating a sequential operation signal, by a sequential control circuit, which is an analog circuit and operated sequentially depending upon the input power; and
turning, by a switching circuit, on or off a plurality of light sources of a lamp module depending upon the sequential operation signal, and wherein the plurality of light sources is connected in series to form a column group, a plurality of column groups formed of the column group in plural is arranged in parallel and each column group including the plurality of light sources is turned on with a same power,
wherein the predetermined waveform has a rising period having a linear slope during which the input power rises with the predetermined linear slope, and
wherein the sequential control circuit is a zener diode set including a plurality of zener diodes which is connected in parallel and has different breakdown voltages, respectively, a front end of each of the plurality of zener diodes having a same voltage level.

11. The sequential lighting method of claim 10, wherein the predetermined waveform includes a saw tooth waveform having an OFF period that no input power is supplied and the rising period, as one cycle.

12. The sequential lighting method of claim 11, wherein the predetermined waveform further includes a stable period that maintains a maximum input power during a predetermined time until a next cycle is performed.

13. The sequential lighting method of claim 11, wherein the rising period utilizes sequential voltage breakdown.

14. The sequential lighting method of claim 11, wherein the one cycle is less than 200 ms.

15. The sequential lighting method of claim 10,
wherein the switching circuit has a plurality of switching elements connected in parallel, and
wherein each of the switching elements is one of a Field Effect Transistor (FET), a Metal Oxide Semiconductor FET (MOSFET), an Insulated Gate Bipolar Mode Transistor (IGBT), a Gate Turn-Off (GTO), and an Integrated Circuit (IC).

16. The sequential lighting method of claim 10, wherein the power supply device utilizes a separate power or a vehicle power.

17. The sequential lighting method of claim 10, wherein the predetermined waveform is changed for changing a lighting mode from upon operation of a turn signal to upon operation of an emergency light.

18. The sequential lighting method of claim 10,
wherein each of the light sources is one of a Light Emitting Diode (LED), an Organic LED (OLED), a Carbon NanoTube (CNT), and an Ultra Constant Discharge Lamp (UCD).

* * * * *